US005976686A

United States Patent [19]

Kaytor et al.

[11] Patent Number: 5,976,686
[45] Date of Patent: Nov. 2, 1999

[54] DIFFUSE REFLECTIVE ARTICLES

[75] Inventors: Scott R. Kaytor, Minneapolis; Kenneth A. Epstein, St. Paul; John C. Harvey, Oakdale; Stephen J. Pojar, New Scandia Township; Neal T. Strand, Woodbury; Clinton P. Waller, Jr., White Bear Lake; William A. Hibbard, Woodbury, all of Minn.; David R. Gagnon, London, Canada

[73] Assignee: 3M Innovative Properties Company, St. Paul, Minn.

[21] Appl. No.: 08/957,558

[22] Filed: Oct. 24, 1997

[51] Int. Cl.$^6$ ....................................................... B32B 5/22
[52] U.S. Cl. .............................. 428/317.9; 428/315.5; 428/315.7; 428/316.6; 428/318.4; 428/319.1; 359/599; 359/515; 362/341
[58] Field of Search .......................... 428/315.5, 315.7, 428/316.6, 317.9, 318.4, 319.1; 359/599, 515; 362/341

[56] References Cited

U.S. PATENT DOCUMENTS

| | | | |
|---|---|---|---|
| 3,201,364 | 8/1965 | Sayler | 260/33.6 |
| 4,114,983 | 9/1978 | Moffitt et al. | 350/164 |
| 4,260,220 | 4/1981 | Whitehead | 350/96.28 |
| 4,539,256 | 9/1985 | Shipman | 428/315.5 |
| 4,615,579 | 10/1986 | Whitehead | 350/96.1 |
| 4,726,989 | 2/1988 | Mrozinski | 428/315.5 |
| 4,750,798 | 6/1988 | Whitehead | 350/96.1 |
| 4,787,708 | 11/1988 | Whitehead | 350/96.28 |
| 4,791,540 | 12/1988 | Dreyer, Jr. et al. | 362/331 |
| 4,799,131 | 1/1989 | Aho et al. | 362/61 |
| 4,805,984 | 2/1989 | Cobb, Jr. | 350/96.28 |
| 4,867,881 | 9/1989 | Kinzer | 210/490 |
| 4,937,716 | 6/1990 | Whitehead | 362/268 |
| 4,952,023 | 8/1990 | Bradshaw et al. | 350/102 |
| 4,989,948 | 2/1991 | Dreyer, Jr. | 350/97 |
| 5,095,415 | 3/1992 | Andereson et al. | 362/329 |
| 5,186,530 | 2/1993 | Whitehead | 362/31 |
| 5,224,770 | 7/1993 | Simmons et al. | 362/29 |
| 5,309,544 | 5/1994 | Saxe | 385/146 |
| 5,596,450 | 1/1997 | Hannon et al. | 359/599 |
| 5,689,364 | 11/1997 | McGregor et al. | 359/599 X |
| 5,781,342 | 7/1998 | Hannon et al. | 359/599 |
| 5,838,406 | 11/1998 | McGregor et al. | 349/113 |

FOREIGN PATENT DOCUMENTS 0 724 181 A2  7/1996  European Pat. Off. .
WO 95/17699  6/1995  WIPO .

OTHER PUBLICATIONS

R. E. Kesting et al., "Synthetic Polymeric Membranes, A Structural Perspective", Second Edition, *John Wiley & Sons*, 1985, p. 299.

*Primary Examiner*—Daniel Zirker
*Attorney, Agent, or Firm*—Douglas B. Little

[57] ABSTRACT

Diffuse reflective materials attached to a structure formed by thermally induced phase separation of a thermoplastic polymer and a diluent providing enhanced flexibility and reflectivity especially in the visible wavelengths of 380–730 nanometers are described. Such materials find a wide variety of application among combinations with other reflective layers. The diffuse reflective articles are useful in backlight units of liquid crystal displays, lights, copy machines, projection system displays, facsimile apparatus, electronic blackboards, diffuse white standards, photographic lights and the like.

19 Claims, 15 Drawing Sheets

DIFFUSE REFLECTIVE ARTICLES

TECHNICAL FIELD

The present invention relates to diffuse reflective articles, e.g. porous polymeric sheets, formed from a thermoplastic polymer and a diluent employing thermally induced phase separation technology (TIPS).

BACKGROUND

In contrast to specular or mirror reflection in which light is reflected back only at an angle equal to that of the incident radiation, diffuse reflection provides reflective light luminance at many angles. Typical diffuse reflectors used for example as white standards for various light measuring test instruments are made of white inorganic compounds (such as barium sulfate or magnesium oxide) in the form of pressed cake or ceramic tile, all of which are expensive, stiff, and brittle. Other diffuse reflectors are (1) microvoided particle-filled articles that depend on a difference in index of refraction of the particles, the surrounding matrix and optional air-filled voids created from stretching and (2) microporous materials made from a sintered polytetrafluoroethylene suspension.

Another useful technology for producing microporous films is thermally induced phase separation (TIPS). This technology has been employed in the preparation of microporous materials wherein thermoplastic polymer and a diluent are separated by a liquid-liquid phase separation as described in U.S. Pat. Nos. 4,247,498 and 4,867,881. A solid-liquid phase separation process has been described in U.S. Pat. No. 4,539,256. The use of nucleating agents incorporated in the microporous material is also described as an improvement in the solid-liquid phase separation method, U.S. Pat. No. 4,726,989.

Effective but inexpensive diffuse reflective articles are still needed for the many diverse light management applications that are being developed.

DISCLOSURE OF INVENTION

It is known from optical physics that incident light or radiation is significantly scattered and diffusely reflected by an article that is made from two or more non-absorbing materials having different refractive indices if the structure of the article provides regions of each material with the appropriate size. To make an efficient diffuse reflector, the size (i.e. the cross-sectional width or height) of the light-scattering regions or sites of the article should be about the same as the wavelength of the light to be reflected. If the sizes of the scattering sites are a great deal smaller than the wavelength of interest, the light passes through the article. If the sizes are a great deal larger, the overall thickness required to substantially diffusely reflect most of the light is prohibitively large. It is also known that the efficiency of the reflector is increased as the difference in refractive index of the two media is increased.

The present invention provides microporous layers using TIPS technology that are flexible and can diffusely reflect more radiation, e.g., visible light having a wavelength of from 380–730 nanometers (nm), more efficiently than most other known reflectors of similar thickness and accomplish this with raw materials that are both inexpensive and readily available. This measured reflectivity is dependent on the test method used, as many tests are inaccurate in measuring absolute reflectance values approaching 100%. In addition, extremely high diffuse reflectivity of these TIPS layers has been found in the near infrared and ultraviolet wavelengths.

Accordingly, the present invention is a diffuse reflective article including a diffuse reflective material attached to a structure where the diffuse reflective material is made of a porous polymeric sheet having an air or void region and a material region where the material region forms a network of material containing:

(a) a polymer component; and
(b) a diluent component, said diluent component being miscible with the polymer component at a temperature above the melting point of the polymer component or a liquid-liquid phase separation temperature of a total solution. Preferably, the porous polymeric sheet has a reflectivity of greater than 92% at a wavelength of 550 nanometers according to ASTM E 1164-94.

A second aspect of the present invention is a diffuse reflective article including a diffuse reflective material attached to a structure wherein said diffuse reflective material is made of a porous polyolefin sheet comprising an air region and a material region where the material region forms a network of material.

A third aspect of the present invention is a diffuse reflective article including a diffuse reflective material attached to a structure wherein said diffuse reflective material is made of a porous polymeric sheet characterized by a microstructure comprising a network of polymer domains and fibrils interconnecting the domains as shown in FIG. 13.

A fourth aspect of the present invention is a method of improving diffuse reflectivity of light using a diffuse reflective material to cause light energy to reflect off of it, wherein the material includes a porous polymeric sheet having an air region and a material region where the material region forms a network of material containing:

(a) a polymer component, and
(b) a diluent component, said diluent component being miscible with the polymer component at a temperature above the melting point of the polymer component or a liquid-liquid phase separation temperature of a total solution.

A fifth aspect of the present invention is an optical cavity including a light source in combination with a housing that further contains a diffuse reflector lining a portion of the cavity facing the light source, the diffuse reflector including a porous polymeric sheet as described above.

The diffuse reflective materials of the present invention have been found to be useful in a variety of structures for light management applications. For example, they have been used as a back reflector in liquid crystal display (LCD) and light emitting diode (LED) backlight constructions. The diffuse reflective materials of the present invention have also been used to increase the brightness of sign cabinets, light fibers, and light conduits. Such articles containing the diffuse reflective material of the present invention are further aspects of the present invention.

The present invention also includes a method of making a diffuse reflective material, including the steps of: (a) melt blending to form a solution comprising about 10 to 90 parts by weight of a polymer component substantially non-absorbing to light to be reflected, and about 10 to 90 parts by weight, based on a total solution content, of a diluent component, said diluent component being miscible with the polymer component at a temperature above the melting temperature of the polymer component, or the liquid-liquid phase separation temperature of the total solution; (b) shaping the solution; (c) phase separating the shaped solution to form phase separated material regions through either (i) crystallization of the polymer component to form a network of polymer domains, or (ii) liquid-liquid phase separation to form networks of a polymer-lean phase; and (d) creating regions of air adjacent to the material regions to form the porous article wherein the article has a reflectivity of greater than 92% at a light wavelength of 550 nanometers as measured according to ASTM E 1164-94.

DETAILED DESCRIPTION

Figure 1:
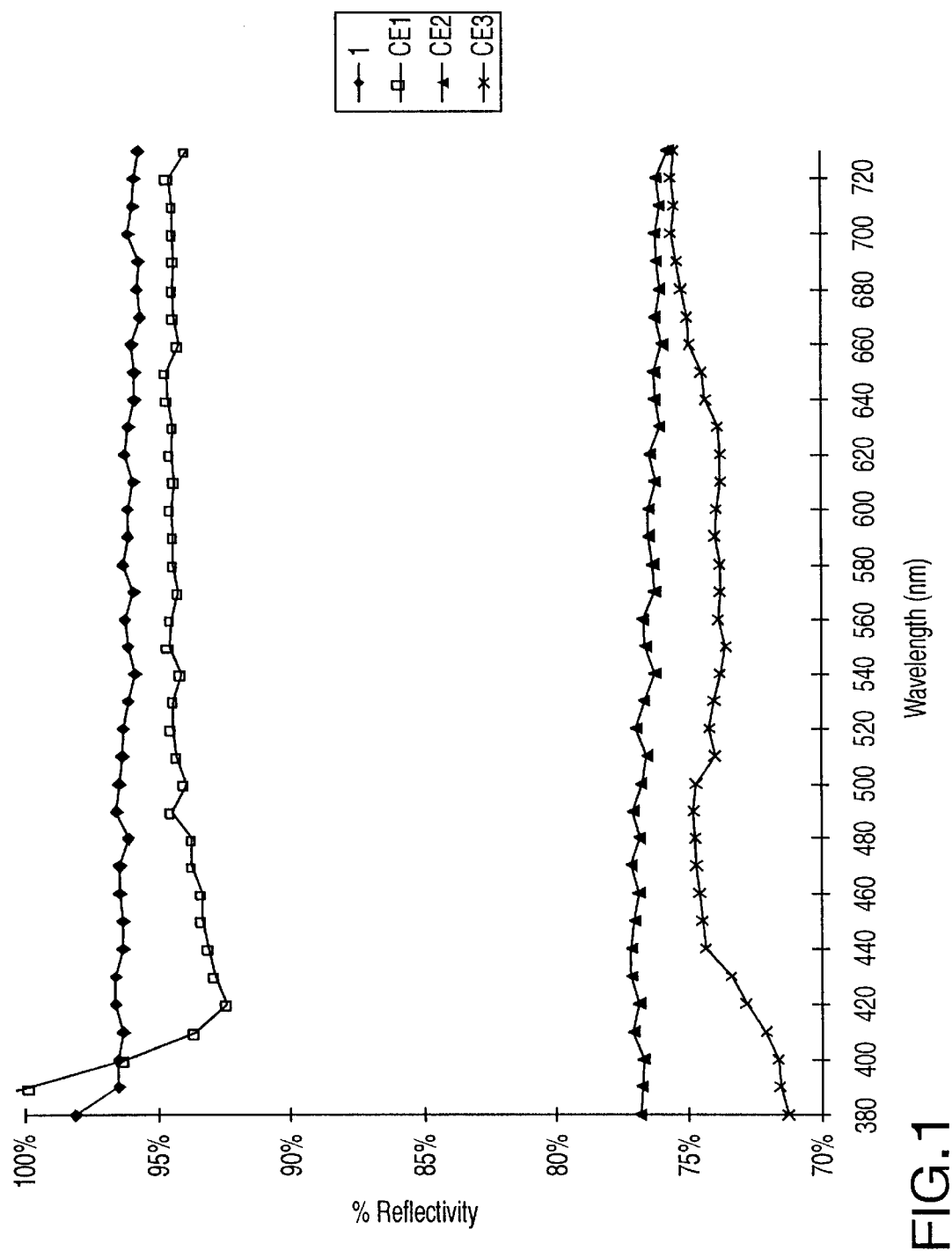
FIG. 1 is a graph comparing the diffuse reflectivity of a material of the invention with various commercially known diffuse reflectors.

The diffuse reflective article of the present invention includes a porous polymeric layer that has a desirable density of light scattering sites. The light scattering site of the invention includes two regions, a material region and an air region, adjacent to each other that have a significant difference between their respective indices of refraction and are non-absorbing to the desired wavelength of light that is to be diffusely reflected. To make an efficient diffuse reflector, the size (i.e. the cross-sectional width or height of fibrils, spherulites, void spaces or other features of the microstructure of the polymeric layer) of the light-scattering regions of the article should be on the order of the wavelength of the light to be reflected. If the sizes of the scattering sites are a great deal smaller than the wavelength of interest, the light passes through the article. If the sizes are a great deal larger, the overall thickness required to substantially diffusely reflect most of the light is prohibitively large. Generally, for diffuse light reflectors, the more phase light scattering sites there are per volume the better.

Preferably, the material region comprises; (a) at least about 20 parts by weight of a polymer component; and (b) less than about 80 parts by weight of a diluent component.

The unique morphology resulting from diffuse reflectors made via the TIPS process (both solid/liquid and liquid/liquid) is particularly useful in making a practical reflector having high diffuse reflection. The morphology of the solid medium has small dimensions because it is formed by phase separating a polymer and a diluent from a solution. The TIPS articles have solid and air regions (or void spaces) of a particular size and comprise materials that do not absorb radiation in the wavelength desired to be diffusely reflected. Thus, for the diffuse reflection of visible light, 380–730 nanometers, the polymer materials preferred are, for example, polyolefins such as polypropylene, polyethylene; copolymers of ethylene and vinyl acetate, or compatible mixtures thereof. Also, because diluent may be present in varying amounts, the diluent should also be non-absorbing—more so when more is present or higher diffuse reflectance is desired. Preferably, the diffuse reflectors are made by the solid/liquid TIPS process because the process is typically less expensive.

As used herein, the term "polymer material" refers only to polymers that do not substantially absorb light at a wavelength where light is to be reflected and which are melt-processible under melt processing conditions.

As used herein, the term "crystalline" with regard to polymer components includes polymers which are at least partially crystalline, preferably having a crystallinity of greater than 20% as measured by Differential Scanning Calorimetry (DSC). Crystalline polymer structures in melt-processed polymers are known.

As used herein, the term "high density polyethylene" refers to a polyethylene having a crystallinity of 80–90% and a density of 0.94–0.96 g/cm$^3$. High density polyethylene is a preferred polyethylene in the present invention.

As used herein, the term "melting temperature" refers to the temperature at or above which a polymer material alone or in a blend with a diluent will melt and form a solution.

As used herein, the term "crystallization temperature" refers to the temperature at or below which a polymer material alone or in a blend with a diluent, will crystallize and phase separate.

As used herein, the term "liquid-liquid phase separation temperature" refers to the temperature above which the polymer and the diluent form a solution, and at or below which a melt of the homogeneous polymer/diluent phase separates by either binodal or spinodal decomposition.

As used herein, the term "diluent-in" refers to a microporous film made by TIPS where the diluent component is not removed.

As used herein, the term "diluent-out" refers to a microporous film made by TIPS where the diluent component is essentially removed.

As used herein, the term "structure" refers to any unit or article capable of holding or supporting a diffuse reflective material in place, such as, for example, a rigid or flexible frame, an awning, umbrella, backlight constructions having both static or moving images, light conduits, light boxes and reflectors.

As used herein, the term "optical cavity" refers to an enclosure designed to contain a light source and direct the light from the light source toward an object benefiting from illumination, such as a static display, a changing image or an insufficiently illuminated object.

Diluent components are those that form a solution with a polymer material at an elevated temperature to form a solution but also permit the polymer to phase separate when cooled. Useful diluent component materials include (1) those mentioned for solid-liquid phase separation in Shipman, U.S. Pat. No. 4,539,256, incorporated herein by reference, (2) those mentioned as useful for liquid-liquid phase separation in Kinzer, U.S. Pat. No. 4,867,881, incorporated herein by reference, and (3) additional materials such as dodecyl alcohol, hexadecyl alcohol, octadecyl alcohol, dicyclohexylphthalate, triphenyl phosphate, paraffin wax, liquid paraffin, stearyl alcohol, o-dichlorobenzene, trichlorobenzene, dibutyl phthalate, dibutyl sebacate, and dibenzyl ether.

If most of the diluent is extracted, the transparency of the diluent to the light that is being reflected is of little importance. However, the more diluent that remains with the polymer, the more important the transparency of the diluent becomes. In cases where a significant amount of diluent remains, the diluent should be transparent to the radiation being reflected. In this case, the preferred diluent is mineral oil.

In addition to polymer material and diluent, the diffuse reflective article of the present invention may also contain conventional fillers or additive materials in limited quantity so as not to interfere with the formation of the article, and so as not to result in unwanted exuding of the additive. Such additives may include anti-static materials, antioxidants, dyes, pigments, plasticizers, ultraviolet light (UV) absorbers, nucleating agents and the like. The amount of additive is typically less than 10% of the weight of the polymeric mixture, preferably less than 2% by weight. Thus, for example, in a solid-liquid TIPS process, the use of a nucleating agent has been found to enhance crystallization of the polymer material, as described in U.S. Pat. No. 4,726,989, which reference is incorporated herein.

Generally, the TIPS process requires a polymer and a diluent which form a single homogenous phase at an elevated temperature. To process a TIPS film, the diluent and polymer are fed into an extruder which heats and nixes the two together to form the homogenous liquid solution. This solution is then either cooled in air or, preferably, cast into a film-like article and cooled upon contact with a casting wheel. During the cooling process for the solid/liquid TIPS constructions, the polymer crystallizes out of the solution to cause the formation of a solid polymer phase and liquid diluent phase. The solid phase consists of spherulites held together by polymer chain tie fibrils. In the case of a liquid-liquid TIPS process, the polymer separates out of the solution to form a second liquid phase of polymer-lean material.

After phase separation, the film-like article is typically transparent and can be processed as either a diluent-out or a diluent-in product into microporous film articles. Diluent-out film is made by extracting substantially all of the diluent from the film using a volatile solvent. This solvent is then evaporated away leaving behind air voids where the diluent had been, thus creating a porous film. To increase the air void volume, the film is then oriented or stretched in at least one direction and preferably in both the down-web (also called the longitudinal or the machine) and transverse (also called the cross-web) directions. Diluent-in films are made by simply bypassing the extraction step and orienting the film. After orienting, the diluent is trapped in the amorphous portions of the polymer which makes the porous film dry to the touch. This method also provides useful light scattering site dimensions and avoids the expensive and rate-limiting extraction step. Of course, combinations of stretching and extraction may be used to achieve desired product performances for specific products.

In particular, to achieve the desired light scattering site density with TIPS, the process involves four steps:

(1) melt blending to form a solution comprising about 10 to 80 parts by weight of a polymer component that is substantially non-absorbing to the light to be reflected, and about 10 to 90 parts by weight, based on a total solution content, of a diluent component, said diluent component being miscible with the polymer component at a temperature above the melting temperature of the polymer component, or the liquid-liquid phase separation temperature of the total solution;

(2) shaping the solution;

(3) phase separating the shaped solution to form phase separated material, i.e., polymer, regions through either (i) crystallization of the polymer component to form a network of polymer domains, or (ii) liquid-liquid phase separation to form networks of a polymer-lean phase; and (4) creating regions of air adjacent to the material regions to form the porous article; the article having a reflectivity of greater than 92%, preferably greater than 94%, at a wavelength of 550 nanometers according to ASTM E 1164-94.

The size of the material regions (spherulites, cells or other solid structures) in relation to the air or void regions is important to achieve high performance diffuse reflectors. The structure can be varied by manipulation of five process variables: (1) quench rate (time for the polymer/diluent solution to cool and phase separate), (2) heterogeneous nucleating agent presence and concentration (useful with solid/liquid TIPS), (3) polymer component to diluent component weight ratio, (4) stretch and (5) diluent extraction. The size of the material region of each light scattering site is influenced by the first two and fourth, and the size of the air region of each light scattering site is influenced by all five.

The phase separation step to form the desirable size of material regions to make a useful and economical diffuse reflector can be carried out by (1) cooling the solution fast enough, (2) using nucleating agents (with solid/liquid TIPS), or (3) a combination of both. In TIPS, cooling can be achieved by maximizing the intimate contact of the hot solution to a quenching surface or medium. Typically microporous films made by the solid/liquid TIPS process are cooled by casting on a patterned roll. Protrusions in the pattern result in less contact between the metal cooling roll and the hot solution; thus slowing the cooling of the solution when compared to that observed with a smooth metal roll. Articles quenched on a patterned roll are particularly useful as filter media but generally have a diffuse reflectivity of less than 92% at a wavelength of 550 nanometers according to ASTM E 1164-94. However, if smooth metal rolls are used, the faster quenching resulting from the solution having better contact with the metal cooling roll results in a nearly dense skin layer on the casting roll side of the film. The thin "skin" layer, which can appear as a glossy side, contributes some specular reflectance but does not adversely affect the use of the film as a diffuse light reflector. The side opposite the glossy side typically has a matte appearance.

The air regions are formed by an interaction of all five process variables mentioned above. For example, if diluent extraction is used, less stretching and a higher content of diluent should be used to achieve a desired diffuse reflector. Likewise, if diluent extraction is not used, more stretching is desirable and if both diluent extraction and stretching are used, lower diluent content is generally desirable. A fast quench rate or the presence of nucleating agent and the concentrations of nucleating agent used influence the number of spherulites (solid/liquid) or polymer lean cells (liquid/liquid) that are formed which in turn influences the distribution of the air that fills the voids caused by stretching or washing.

The diffuse reflective articles of the present invention have a wide variety of light management applications. In a multi-layer system, the light diffusing layer may be combined in a number of reflective devices with a specular reflective layer. The light diffusing article may be used to partially line an optical cavity to increase the efficient use of light to illuminate such things as, for example, a partially transparent image that may be either static (such as a graphics film or a transparency) or switchable (such as a liquid crystal display). Thus, optical cavities that are partially lined with diffuse reflector films of the invention may be used in such devices as backlight units such as liquid crystal display constructions (LCDs), lights, copying machines, projection system displays, facsimile apparatus, electronic blackboards, diffuse light standards, and photographic lights. They may also be part of a sign cabinet system, a light conduit or units containing light emitting diodes (LEDs).

Thus, for example, the diffuse reflective article of the present invention has been found to be especially beneficial as a back reflector in commercial back lights used for liquid crystal displays. In this type of application, the TIPS film is placed directly behind the light source which is illuminating a display. The porous film simply acts to reflect back all the light which is not directed toward the display and ultimately a viewer. The scattering or diffuse reflection characteristics of the porous film backreflector also helps provide a more overall diffuse light source and more evenly lit display, and are suitable as diffuse reflector and polarization randomizers as described in Patent Application Publication No. WO 95/17699 and U.S. patent application Ser. No. 08/807262 filed Feb. 28, 1997.

Figure 9A:
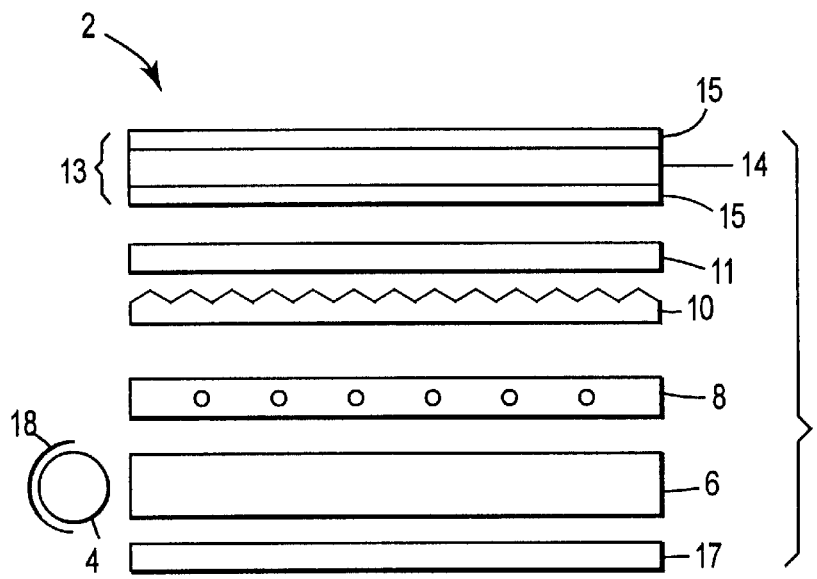
FIGS. 9A–D are schematic diagrams of LCD devices using diffuse reflectors of the invention.
Figure 9B:
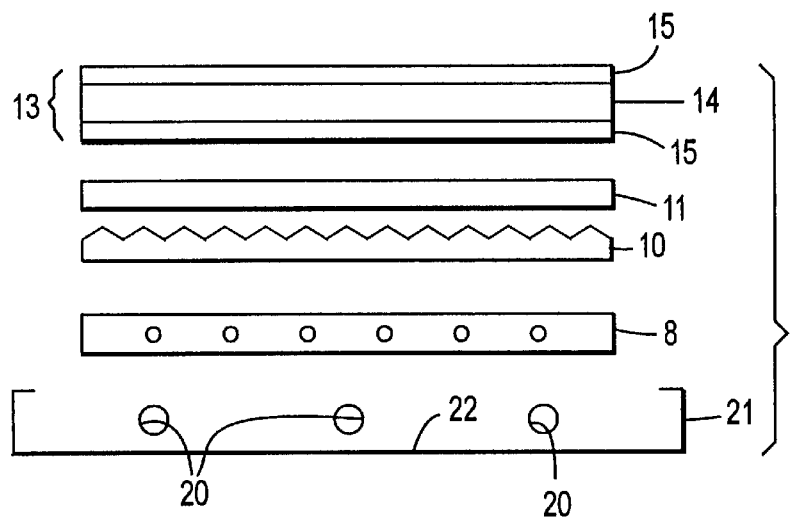

Schematic figures of several constructions using liquid crystal displays (LCD) and incorporating these diffuse reflecting articles are shown in FIGS. 9A–D. FIG. 9A, a device 2 is shown that has a fluorescent light source 4 coupled to a plastic light guide 6. A diffuser 8, an optional brightness enhancing film 10, such as the films described in U.S. Pat. Nos. 4,906,070 and 5,056,892 and available from Minnesota Mining and Manufacturing Company (3M), and an optional reflective polarizer film (11), as described in Patent Publications WO 91/05327 and WO 97/32224 (available from 3M), are placed on top of the guide 6 and act to redirect and polarize the light emitted from the plastic light guide towards the LCD and the viewer. If the light is not at the correct range of viewing angles, nor of the correct polarization, it is reflected back towards the light guide 6. The LCD 13 is placed on top of the reflective polarizing film 11 and is typically constructed of a liquid crystal 14 sandwiched between two polarizers 15.

The light guide 6 directs light towards the viewer. Some light is emitted from the back surface of the light guide. The diffuse reflecting article 17 of the invention is placed behind the light guide 6 and reflects approximately 90% or more of this light towards the front surface of the guide and to the viewer. It also reflects and randomizes the polarization of the light reflected from the reflective polarizing film 11 and brightness enhancing film 10 layers placed on top of the light guide 6. The diffuse reflecting element 17 acts as a highly reflective surface that enhances the optical efficiency of the LCD optical cavity. Preferably, the diffuse reflecting element 17 should scatter or reflect light diffusely, should depolarize the light and should have high reflectance, i.e., greater than 92%, more preferable greater than 94%, over all visible wavelengths for visible light applications.

The diffuse reflecting article 17 acts as a light recycler by (1) reflecting the light rejected from the reflective polarizing film 11 and/or from the brightness enhancement film 10 and (2) giving that light another opportunity to reach a viewer. This rejecting and recycling can occur numerous times increasing the amount of light directed towards the viewer.

This increased optical efficiency of the diffuse reflector can be used to reflect incident light between layer 10 and the diffuse reflective layer 17 to increase display luminance by controlling the angles over which light is emitted. For instance, brightness enhancing film transmits light within a specific, and narrow angular range and reflects light over another, specific and wider angular range. The reflected light is scattered by the diffuse reflector 17 into all angles. The light within the transmission angles of the brightness enhancing layer 10 is transmitted towards the viewer. Light in the second angular range is reflected for additional scattering.

As an example, the gain obtained on a backlight that is 70% reflective on average is 1.6 if a prismatic brightness enhancing sheet is used that has a refractive index of 1.59 with 90 degree facet angles. Increasing the average reflectance of the backlight to 90% increases the gain to 1.8. The gain increases to 2.0 if there is no absorption loss in the backlight. Thus, a 90% reflectance allows close to the highest possible increase in luminance.

The increased optical efficiency of the diffuse reflector can be used to reflect incident light between the reflective polarizer film 11 and the diffuse reflector layer 17 to increase display luminance by controlling the polarization state of the light transmitted through the reflective polarizer film 11. Many displays have an absorbing polarizer 15 applied to the rear of the display. At least one half of the available light is absorbed when the display is illuminated by unpolarized light. As a result, display luminance is decreased and the display polarizer is heated. Both adverse situations are overcome with the use of a reflective polarizer film 11, because the reflective polarizer film 11 transmits light of one linear polarization state and reflects the other linear polarization state. If the transmission axis of the reflective polarizer film 11 is aligned with the absorbing polarizer transmission axis, the transmitted light is only weakly absorbed by the absorbing polarizer. Also, the light in the reflected polarization state is not absorbed at all by the absorbing polarizer. Instead, it is reflected towards the diffuser reflector 17. The diffuser reflector 17 depolarizes the light, creating a polarization state that has equal polarization components in the reflective polarizer film transmission and reflection states. One half of the light transmits through the reflective polarizer layer 11 towards the viewer. Light in the reflected polarization state, or "undesirable" state, is again scattered by the diffuser reflector 17, providing yet another chance for additional polarization conversion.

Additionally, a diffuse reflector 18 may be placed behind or around a light source 4, such as a cold cathode fluorescent lamp to increase light coupling efficiency into the plastic light guide 6. The diffuse reflector 18 may be used alone, or in combination with a specular reflector placed to increase the total reflectance of the construction.

Figure 9C:
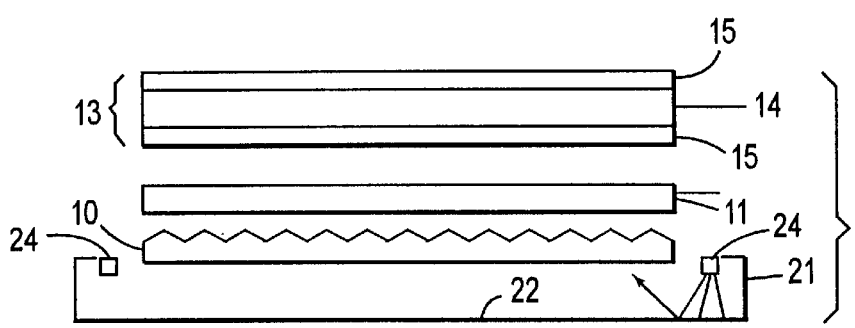
Figure 9D:
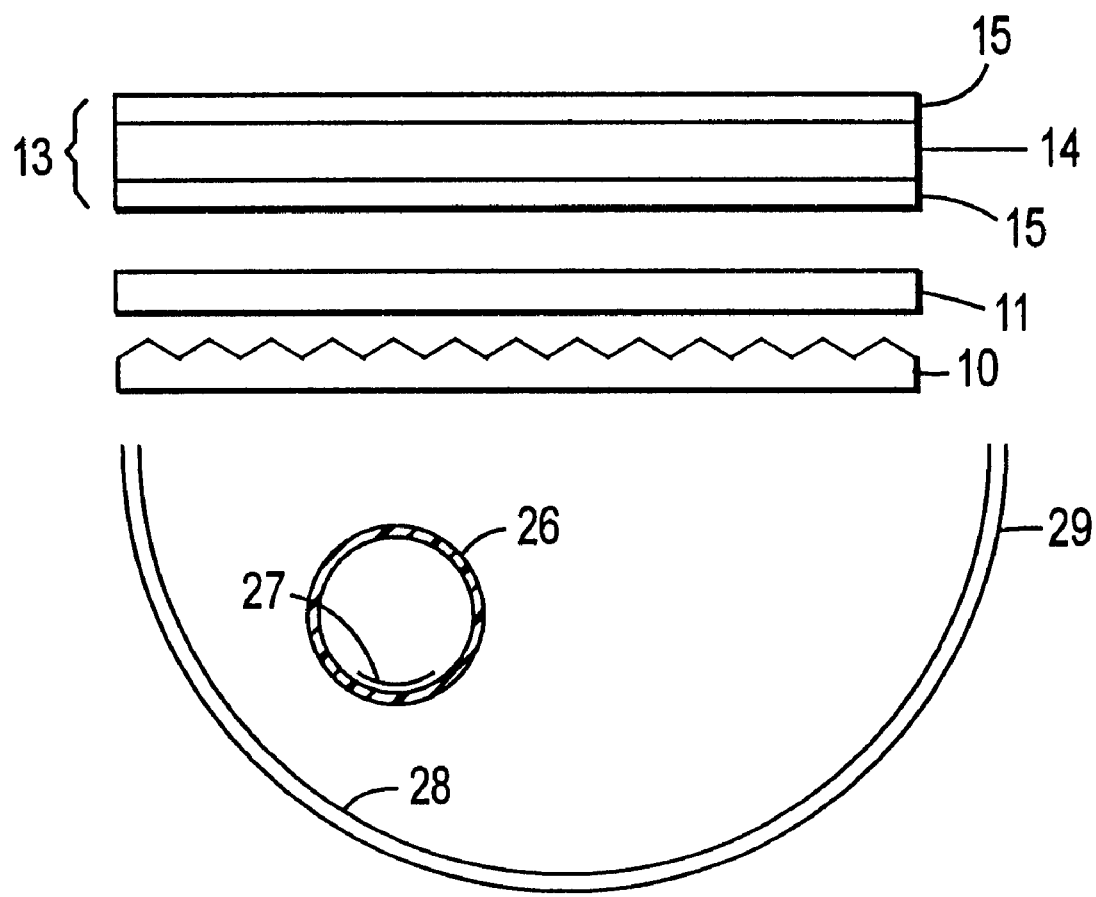

The increased optical efficiency of a diffuse reflector can be used to increase the reflective efficiency of an optical cavity and/or to mix discrete wavelengths of light to make a uniform colored or white light source. In the schematic drawing shown in FIG. 9B, three fluorescent lamps 20 are depicted in an optical cavity 21. All of the lamps may be white or each lamp may be a selected color, such as red, green and blue. In FIG. 9C, the LCD device is shown with two light emitting diodes (LEDs) 24 as the light source that provides light to an optical cavity 21. The diodes may be colored or white. In both FIG. 9B and 9C, the optical cavity 21 is lined with a diffuse reflector 22 to both increase reflectance and mix the discrete colors adequately to form a white light source with good spatial light emitting uniformity to illuminate the LCD. The device schematically shown in FIG. 9D uses a prismatic light conduit 26 as the light source in an optical cavity. Diffuse reflectors are used both in the light conduit as extractors 27 to direct light towards the LCD and as back reflectors 28 to direct the light around the light conduit to form an efficient optical cavity 29.

LEDs are useful light sources for small LCD devices such as medical monitors and automotive displays. LEDs provide the advantages of small size and lower energy consumption, but they have relatively low luminance. The optical efficiency of designs using LED illumination is increased when a diffuse reflective article of the present invention is used as a backreflector in combination with brightness enhancing and reflective polarizer films.

An LCD construction was prepared with the TIPS film of the present invention and compared to diffuse backreflectors commercially available as described in the Example section. It was found that the use of the porous TIPS film of the present invention demonstrated increased brightness by up to 25%. This value could instead mean a longer battery life at the original brightness. Unlike the directional brightness improvement resulting from brightness enhancement films, the TIPS film causes an overall brightness (energy) gain.

LEDs can replace fluorescent lamps as the preferred backlight source for small liquid crystal displays such as medical monitors and automotive displays. The advantage of using LEDs is their low price, small size and low energy consumption. The disadvantage of LEDs is their relatively low brightness. With the use of the diffuse reflective article of the present invention as a backreflector along with known specular reflective film layers, the brightness of LED displays can be increased.

Figure 10:
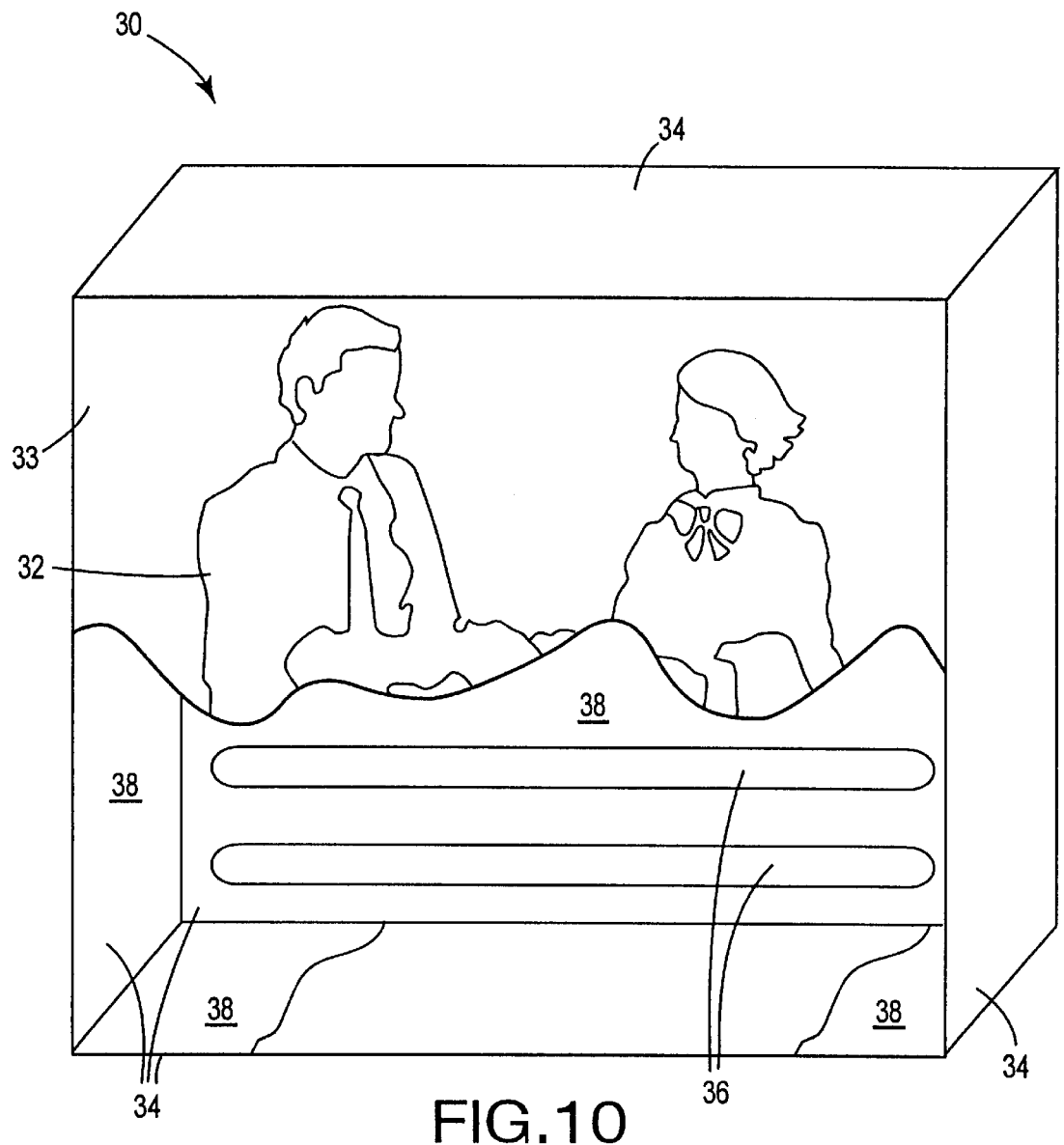
FIG. 10 is a pictorial drawing of a sign cabinet or light box showing one use for the diffuse reflector of this invention.

Display sign cabinets that operate more efficiently by improving brightness while requiring less electrical energy can be made using a diffuse reflective article of the present invention. Sign cabinets are often made of aluminum backs (generally painted white) and sides (typically unpainted) with fluorescence lights that illuminate a front film to display an image. The luminance that displays the image can be increased by up to 43 percent if the back and all four sides of the interior are covered with diffuse reflector articles of the invention. Conversely, energy used to illuminate a display film can be proportionately reduced while retaining the same luminance. One embodiment of the present invention, a sign cabinet, is shown in FIG. 10. The sign cabinet 30 includes an image on film 32 (such as PANAFLEX™ available from 3M) attached as the front panel of a box 33 having the other sides 34 made of an inexpensive and heat resistant material such as aluminum. The box 30 contains a light source 36 able to provide sufficient light to illuminate the imaged film over a prolonged period of time. High intensity fluorescent lights are commonly used so the light intensity is substantially uniform over the entire area of the image. Diffuse reflector sheets 38 are placed on at least one inner surface, preferably all five interior surfaces of the cabinet 30 to minimize the amount of light lost to absorption. With this arrangement, less energy is used to achieve a given level of illumination than with prior known designs, or an image is illuminated with increased brightness.

Figure 11:
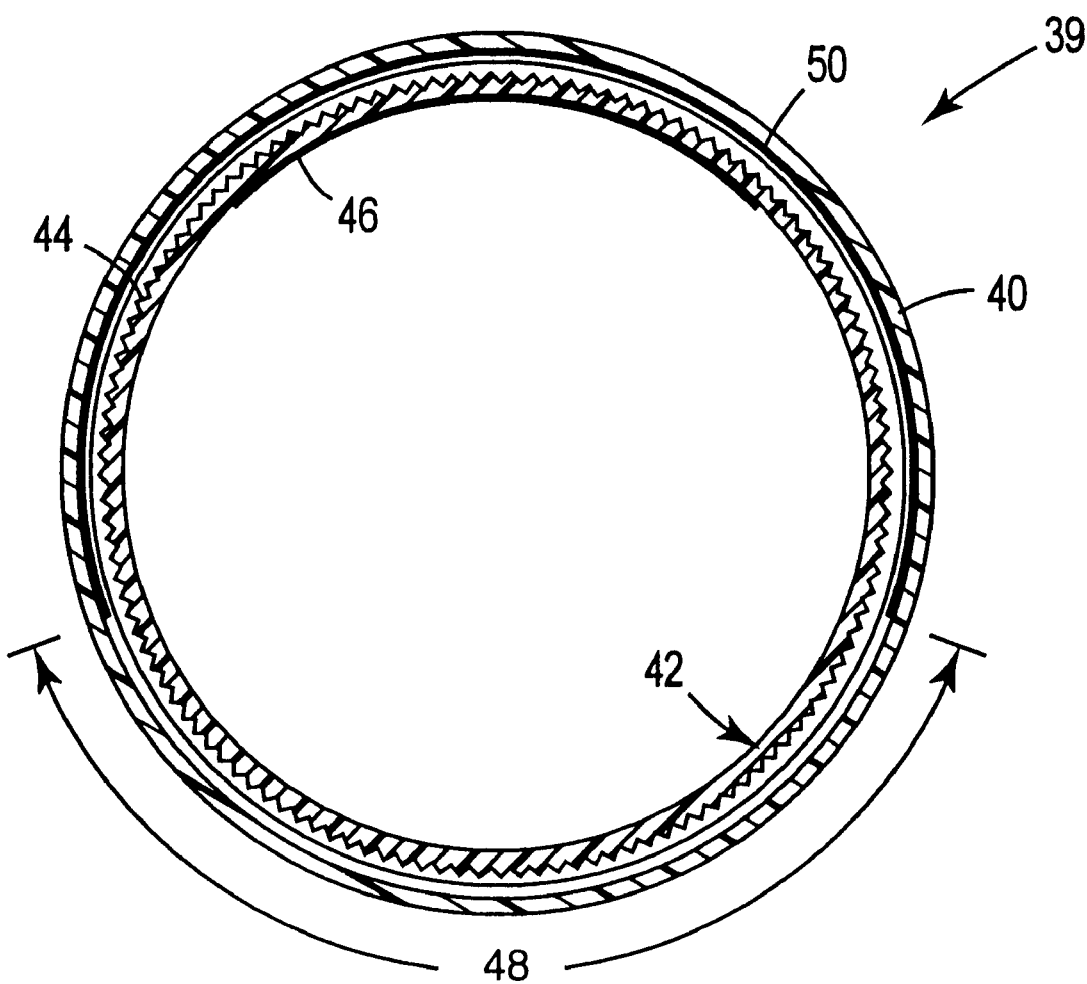
FIG. 11 schematically depicts a cross-section of a light conduit using a diffuse reflector of the invention.

The diffuse reflective article of the invention is also useful in light conduits or applications wherein light is extracted from or emanates from at least a portion of the length of the hollow light conduit. The source of light for a light conduit is typically a point source such as a metal halide lamp, or in the case of rectangular display conduit a linear light source such as a fluorescent tube may be used. Typical applications are general lighting or display lighting that includes such displays as colored tubes and thin display images and signs. Commercially available light conduits (available from 3M and/or described in U.S. Pat. Nos. 4,805,984, 4,850,665 and 5,309,544) currently use diffuse reflectors such as a matte white vinyl film to extract the light and direct it through an emitting surface, and a silver coated poly(ethylene terephthalate) film or TYVEK™ film to back reflect stray light. Use of diffuse reflector articles as extractors or back reflectors increases the efficiency of the light extracted and results in a more uniform diffuse appearance. One embodiment of a light conduit construction 29 is shown in FIG. 11. The light conduit is surrounded by an optional outer shell 40. Inside the outer shell 40 is Optical Lighting Film (OLF) 42 (described in U.S. Pat. Nos. 4,906,070 and 5,056,892 and available from 3M) having a prismatic surface 44 that confines light passing down the conduit to remain within the conduit, but the OLF is substantially transparent to light striking the OLF at off angles (typically greater than 27° to the axis of the conduit). An extractor 46 is placed against the interior of the OLF 42 in regions (generally strips parallel to the conduit axis) where light is desired to be extracted out of the conduit. Light is directed by the extractor against the OLF 42 at angles relative to the axis of the conduit and through the emitting surface 48. Uniform flux output along the length of the light conduit can be achieved by tapering the extractor film from one end of the conduit to the other. More diffusely reflective and less light absorbing extractors are preferred. A back reflector 50 may be placed between the outer shell 40 and the OLF 42 to reflect any stray light that passes through the OLF 42 back into the light conduit and out through the emitting surface 48. In some cases, some transmission of light through the back reflector is desired, for instance, to slightly illuminate a ceiling. The back reflector 50 and the extractor 46 may both be made of TIPS sheeting, and light conduits so made are embodiments of this invention.

The diffuse reflector and some of its uses are further described in the following examples. Unless otherwise stated, data on TIPS films was taken on the glossy surface.

EXAMPLES

Reflectance Spectra—Method 1

This method of determining the diffuse reflectance spectra was used throughout the examples unless otherwise specified.

The total reflectance spectra was determined by using the procedures described in ASTM E 1164-94. A sample was placed in a Lambda 19 UV/VIS/NIR Spectrometer available from Perkin Elmer. The output was a percent reflectance for each wavelength over a predetermined range of wavelengths of either from 380 nanometers (nm) to 730 nm or from 250 nm to 2000 nm.

Reflectance Spectra—Method 2

This method of determining the diffuse reflectance spectra, that generally overstates the diffuse reflective spectra reflectance by between 3 and 4%, was used when samples were mounted on stiff metal sheets and thus could not be tested by Method 1 or unless otherwise specified for relative comparisons.

The reflection spectra was obtained using a GRETAG™ SPM50 Spectrophotometer. The instrument was calibrated using the machine's diffuse white standard. A sample was then illuminated by the light source of the machine and the reflections were analyzed from 380 nm to 730 nm. This method yields percent reflectance values that are somewhat inflated but are useful for illustrating relative differences in aging samples that have been mounted onto an aluminum sheet as they are exposed to similar moisture and ultraviolet light exposure cycles over time.

Example 1 and Comparative Examples 1–3

The reflective performance of various diffuse light reflectors were compared with a TIPS microporous diffuse reflector film.

In Example 1, a transparent polymer component (crystallizable polypropylene available under the trade designation of DS 5D45 from Shell Chemical Co. with a melt flow index of 0.65 dg/min (ASTM D1238, Condition I), crystallinity of 48%, a melting point of 165° C. (measured by DSC) and an index of refraction of 1.50) was mixed with a nucleating agent (dibenzylidine sorbitol, available as MILLAD™ 3905 from Milliken Chemical, Inman S.C.) and fed into the hopper of a 40 mm twin-screw extruder. A transparent oil component (Mineral Oil Superla White #31 available from Amoco Chemical Co.), having a viscosity of 100 centistokes (ASTM D445 at 40° C.) and an index of refraction of 1.48, was introduced into the extruder through an injection port at a rate to provide a composition of 40% by weight of the polymer, 60% by weight mineral oil and 2500 parts by weight of nucleating agent per million parts of combined polymer and diluent. The overall feed rate was 22.7 kg/hr. The polymer was heated to 271° C. in the extruder to melt and, after mixing with the oil, the temperature was maintained at 177° C. during the extrusion. The melt was extruded through a 38.1 cm-wide coat hanger slit die and cast as a 890 μm-thick transparent film onto a casting wheel maintained at 66° C. and having smooth surface. The cast film was washed in 1,1-dichloro 2,2,2-trifluoroethane (available as VERTREL™ 423 from duPont) for 15 minutes in a counterflow extractor, dried for 9 minutes at 47° C. and stretched 2.25 by 2.25 times (in both the machine and transverse directions) at 115° C. The initially transparent film turned opaque white upon extraction and had a final thickness of about 360 μm (14 mils).

Comparative Example 1 was a 190 micrometers (μm) thick titania-filled microvoided poly(ethylene terephthalate) film used as an LCD Backreflector and available as MELINEX™ from ICI Plastics, Wilmington, Del.

Comparative Example 2 was a 150–250 μm thick nonwoven polyethylene fabric available as TYVEK™ from DuPont Co., Wilmington, Del.

Comparative Example 3 was a 105 μm thick white 20 lb. bond paper available as CASCADE™ X-9000 from Boise Cascade.

Example 1 and Comparative Examples 1–3 were tested for their reflectance spectra by method 1 which are shown in FIG. 1. The spectra for Comparative Example 2 was taken of a region that approximated a thickness closer to 150 μm. The reflectivity of Example 1 was better than all the comparative examples across most of the visible light spectrum.

Examples 2–3 and Comparative Example 4

The effect of film thickness was demonstrated.

Examples 2 and 3 were prepared in the same manner as Example 1 except that the casting wheel speed was increased to provide thinner construction having a thickness of about 230 μm (9 mil) and about 130 μm (5 mil) for Examples 2 and 3, respectively, and the washing time and drying time was decreased proportionately or each example.

Comparative Example 4 was a 250 μm thick porous polytetrafluoroethylene film (available as DRP™ Thin Film Reflector from W. L. Gore & Associates, Inc., Elkton, Md).

Figure 2:
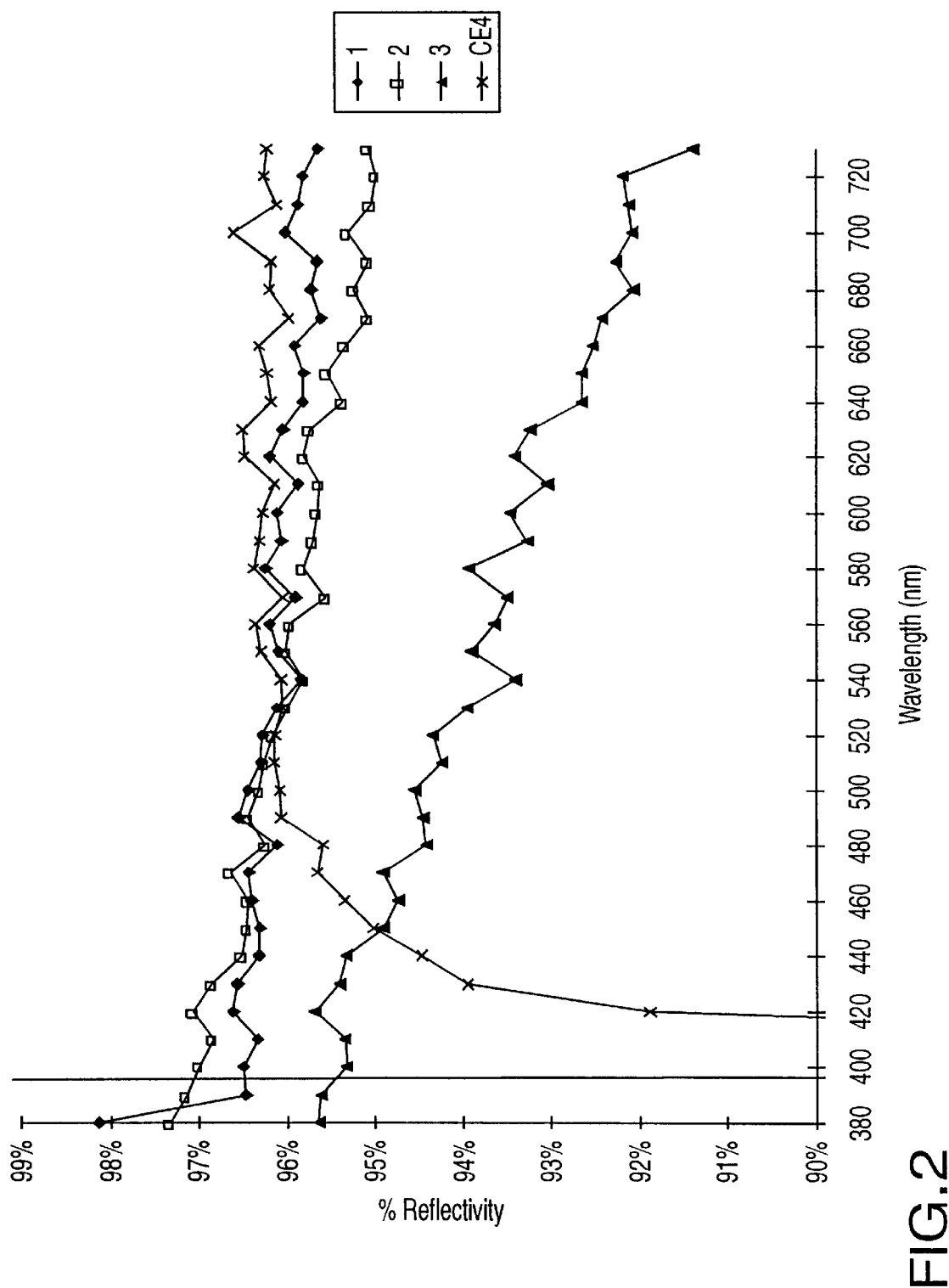
FIG. 2 is a graph illustrating the effect of thickness on the reflectivity of the materials of the invention.

Examples 2 and 3 and Comparative Example 4 were tested for their reflectance spectra which are shown in FIG. 2 together with that of Example 1. The thickest inventive reflector (Example 1) was more reflective than Comparative Example 4 until about 530 nm visible light wavelength, but was slightly less reflective than CE4 at higher wavelengths. Comparative Example 4 was also less reflective than inventive Examples 1 and 2 until about 520 nm wavelength and was less than 3% more reflective at 550 nm than Example 3, a film having a significantly lower processing cost.

Examples 4–6

The effect of diluent extraction was demonstrated on various microporous film constructions.

Example 4 was prepared in a manner similar to Example 1 except that the casting wheel speed was increased to provide a construction with a thickness of about 205 μm (8 mil) and the washing time and drying time was decreased proportionately.

Examples 5 and 6 were made using the same polymer and diluent as Example 1. The two materials were introduced into the extruder to provide a composition of 50% by weight of the polymer and 50% by weight mineral oil The nucleating agent was provided at 750 ppm and 1000 ppm, respectively. The overall feed rate was 20.5 kg/hr. The polymer was heated to 271° C. in the extruder to melt and, after mixing with the oil, the temperature was maintained at 177° C. during the extrusion. The melt was extruded through a 30.5 cm-wide coat hanger slit die and cast as a transparent film onto a casting wheel maintained at 66° C. and having smooth surface. The cast film was stretched 2.0 by 2.0 times at 121° C. The initially transparent films turned opaque white upon orientation (stretching). Example 5 was cast at about 585 μm (23 mil) and its final thickness after orientation was about 355 μm (14 mils). Example 6 was cast at about 405 μm (16 mil) and its final thickness after orientation was 205 μm (8 mils).

Figure 3:
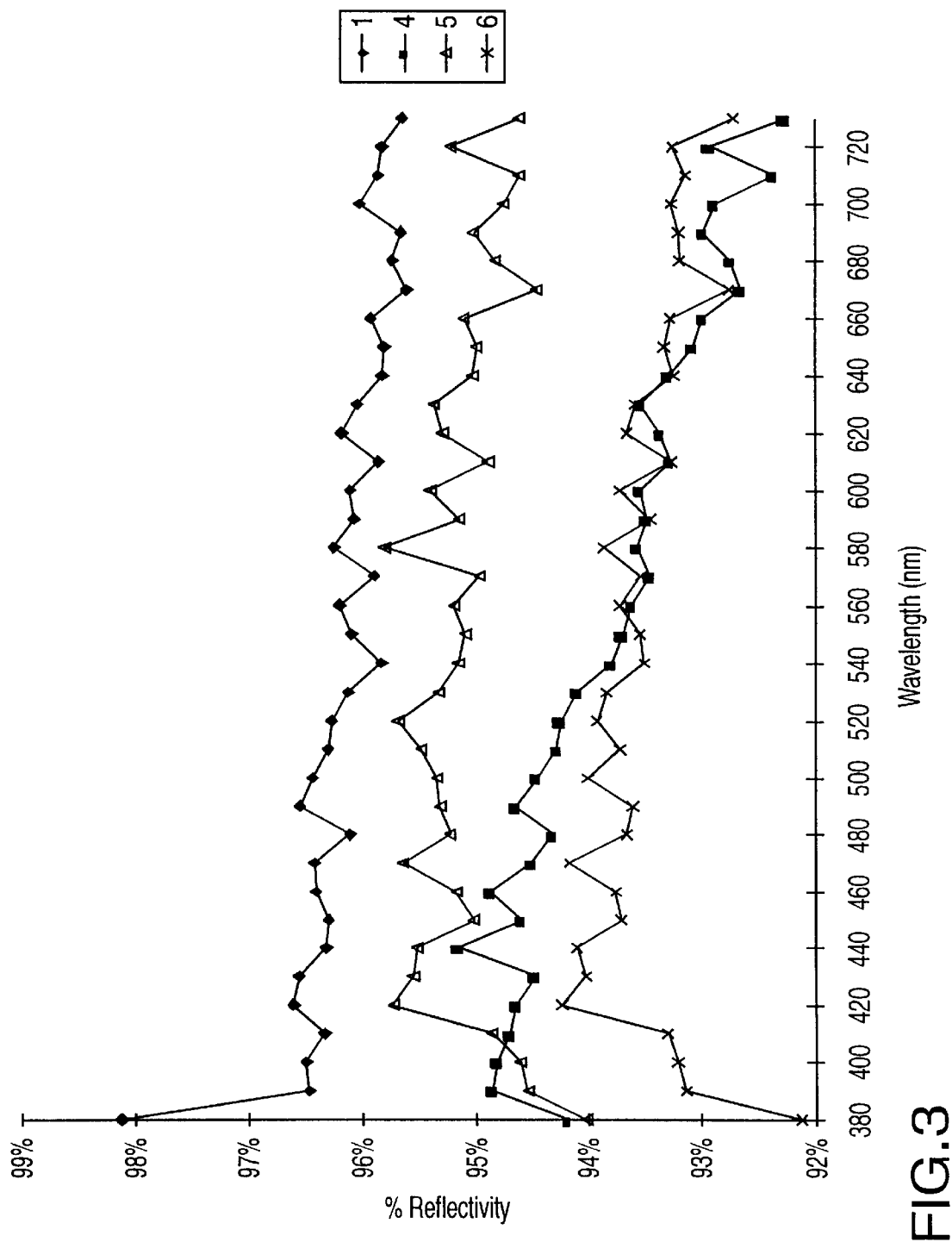
FIG. 3 is a graph illustrating the effect of the presence of diluent on reflectance.

Examples 4–6 were tested for their reflectance spectra which are shown in FIG. 3 together with that of Example 1.

Example 7

The breadth of reflective performance beyond the visible range of light was demonstrated.

Figure 4:
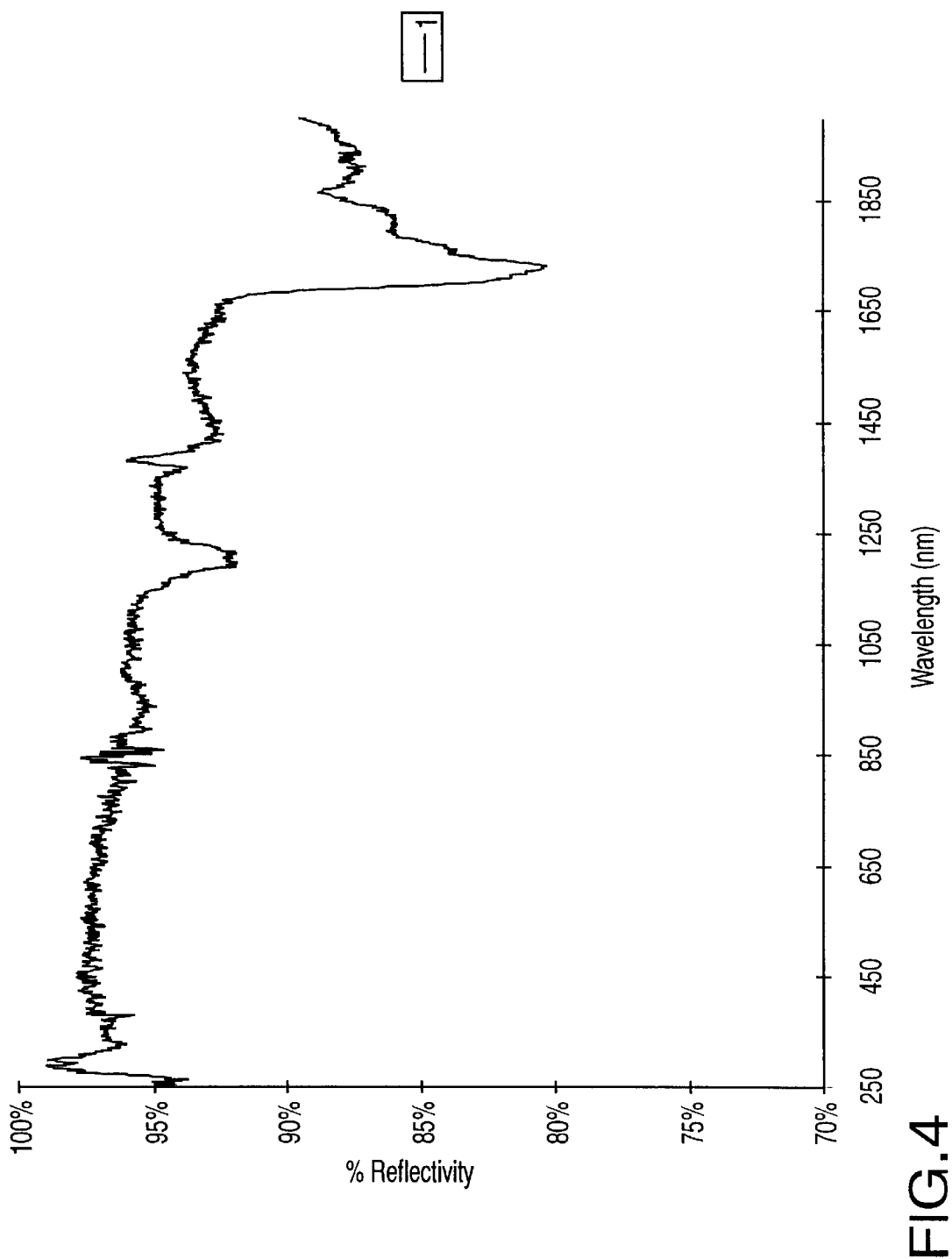
FIG. 4 is a graph of reflectivity vs. wavelength for the inventive material including wavelengths outside the visible range.

The film of Example 1 was measured for reflectance over a wavelength range of from 250 nm to 2000 nm. The spectrum is shown in FIG. 4. The dip in reflectance for wavelengths between 1600 and 1800 nm is due to trace water that is absorbed by the porous film.

Example 8

The effect of stabilizing the diffuse reflector to degradation by moisture, heat and ultraviolet light was demonstrated.

Example 8 was prepared by coating Example 1 on the matte surface with an ultraviolet and thermal stabilizing mixture. A solution formed by mixing two ultraviolet light stabilizers (available as TINUVIN™ 1130 and TINUVIN™ 123, both from Ciba Geigy), a phenolic anti-oxidant (available as IRGANOX™ 1010 from Ciba Geigy), acetone and ethanol in a weight ratio of 2.0:3.5:0.4:2.0:93.1, was coated by spreading a pool of the solution on the surface of a sample of Example 1 with a No. 5 Meyer Rod (a wire wound rod sized to spread a pool of solution into a wet coating having a thickness of approximately a 25 μm (1 mil)). The wet coating imbibed into the porous film and was allowed to dry in the air.

Figure 5A:
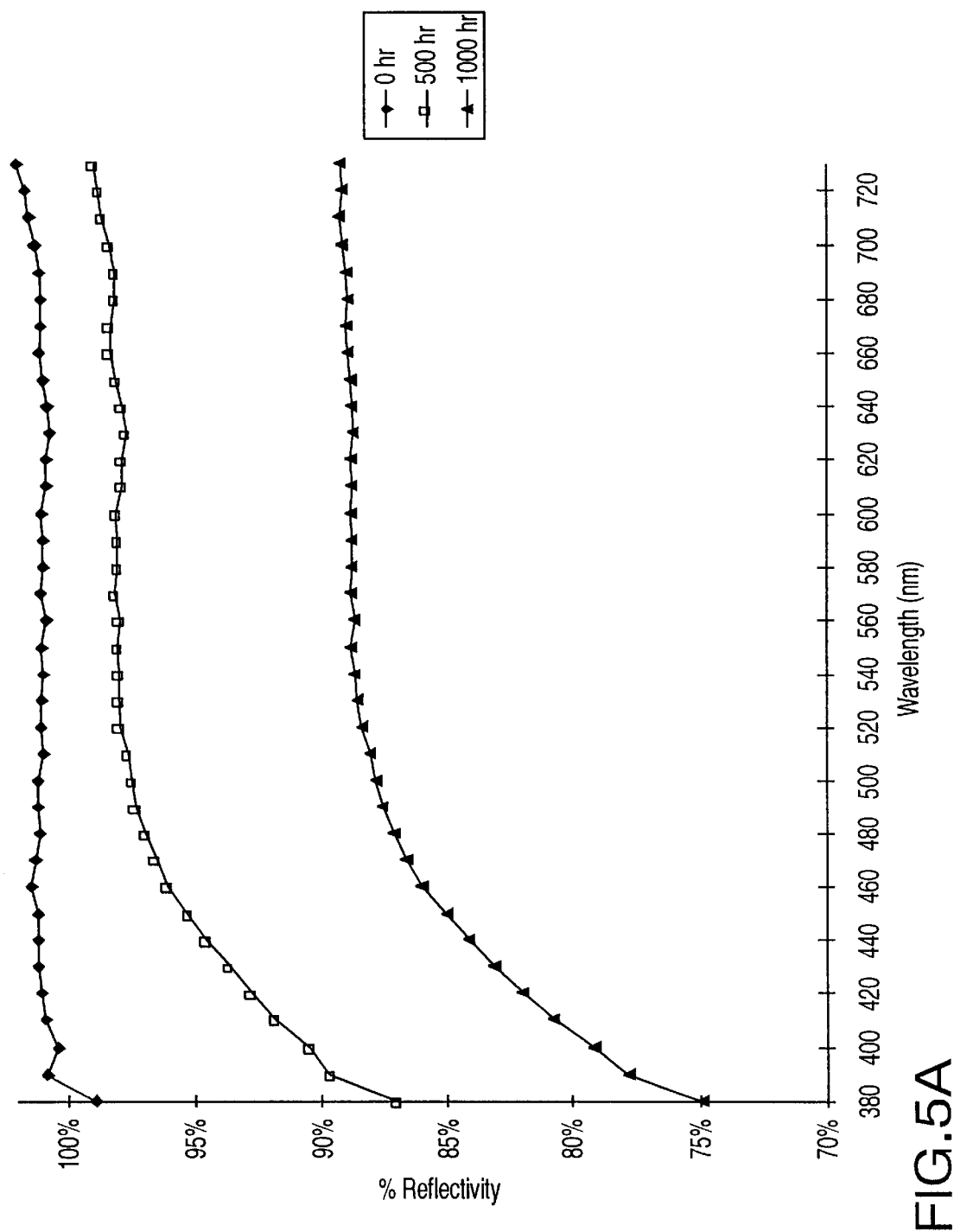
FIGS. 5A and 5B are graphs depicting the effect on the durability of the material of the invention after exposure to ultraviolet light, heat and moisture for various times on film (A) unstabilized and (B) stabilized with a coating.
Figure 5B:
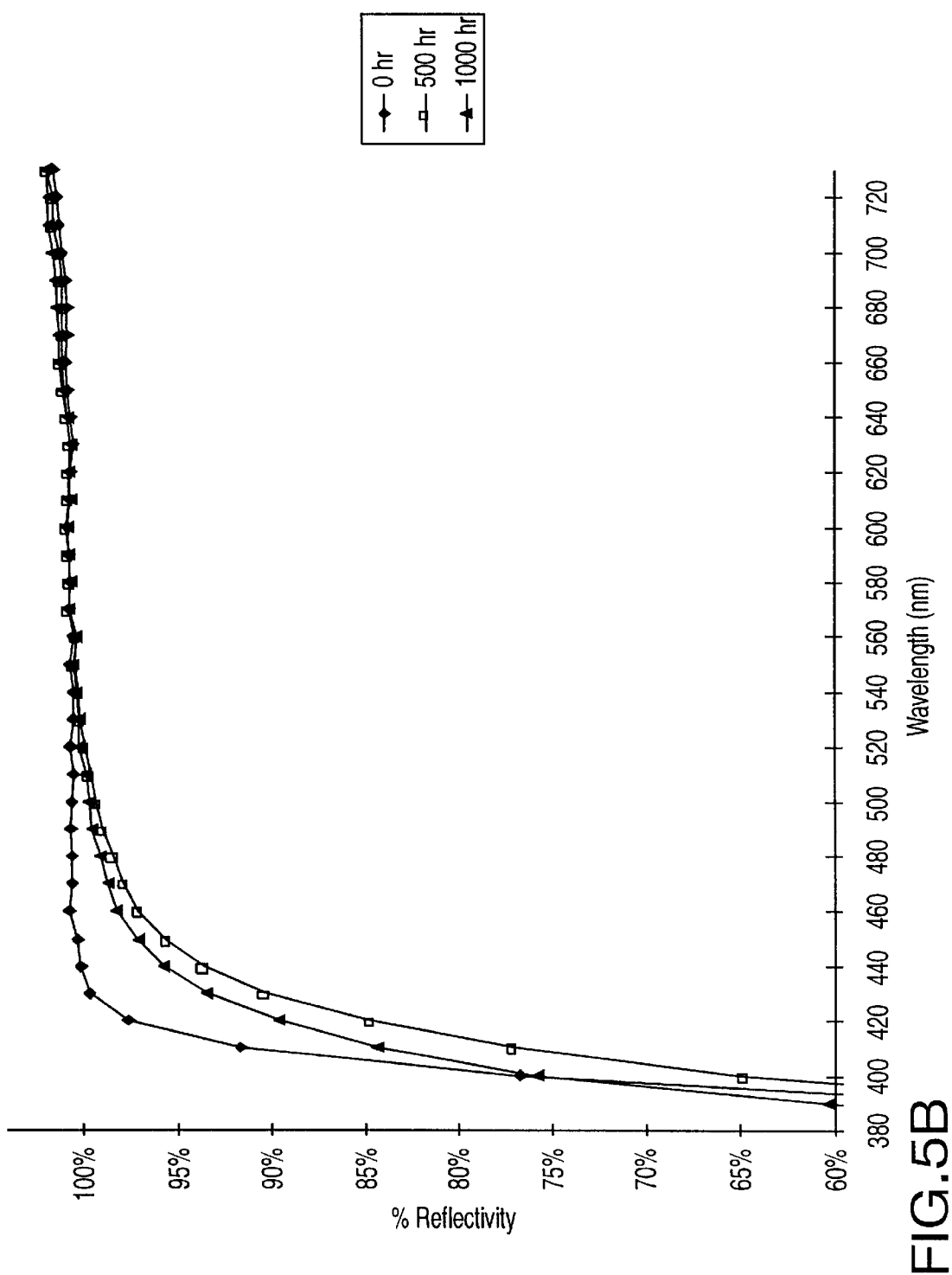

Examples 1 and 8 were exposed for 0,500 and 1000 hours to similar repetitive doses of moisture, heat and ultraviolet light and tested for their reflectance spectra. The results are shown in FIGS. 5A and 5B for Examples 1 and 8, respectively. A comparison of these figures shows that the addition of chemical stabilizers had a beneficial effect of reducing the decline in reflectivity over time under exposures to moisture, heat and ultraviolet light.

Examples 9–10

The effect of varying the polymer to diluent ratio of the input materials was demonstrated.

Examples 9 and 10 were made in a manner similar to Example 1 except the porous films were made from an input ratio of polymer to diluent of 30:70 and 60:40, respectively, the porous films both had a thickness of about 180 μm (7 mils).

Figure 6:
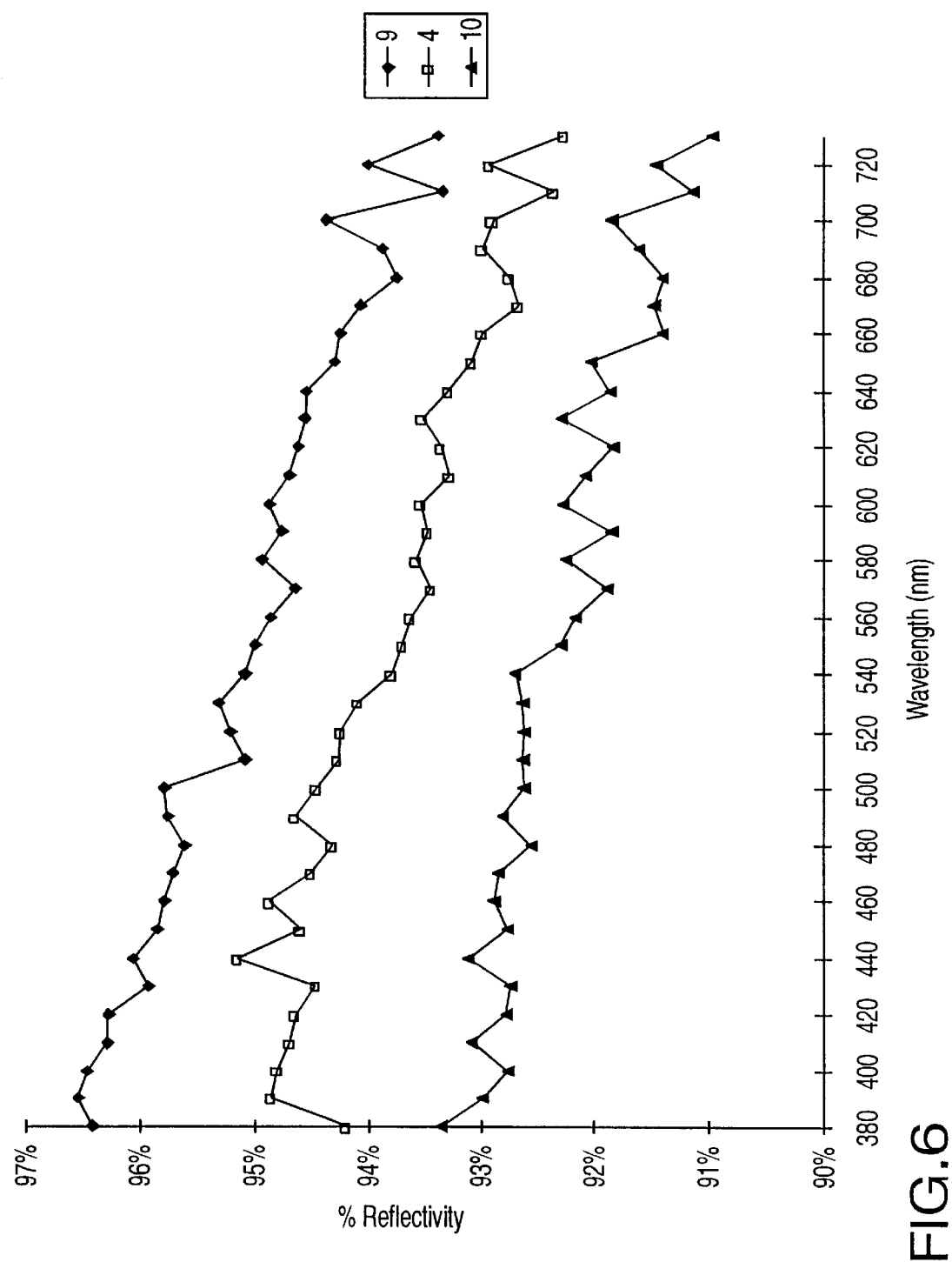
FIG. 6 is a graph showing the effect of polymer:diluent ratios on diffuse reflectance.

Examples 9 and 10 were tested for their reflectance spectra. The results are shown in FIG. 6, along with the plot for Example 4 which had a polymer/diluent ratio of 40:60. The best reflectivity was possessed by the film of Example 9 which was made with the lowest ratio of polymer to diluent.

Examples 11–12

The effects of using another polymer and various voiding techniques were demonstrated.

Examples 11 and 12 were made in a manner similar to Example 1 except the polymer was high density polyethylene (available as polyethylene resin 1285 from Fina Oil and Chemical Co., Dallas, Tex.) with a refractive index of 1.54, no nucleating agent was added and the process conditions were different. The input ratio of polymer to diluent was 25:75 and 18:82, respectively, and the overall feed rate was 13.6 kg/hr. The melt maintenance temperature and casting wheel temperature were 188° C. and 16° C. for Example 11 and 166° C. and 10° C. for Example 12. Example 11 was stretched 1.5 by 1.5 at room temperature and Example 12 was not stretched. The porous films had a final thickness of about 190 μm (8 mils) and about 510 μm (20 mils), respectively.

Figure 7:
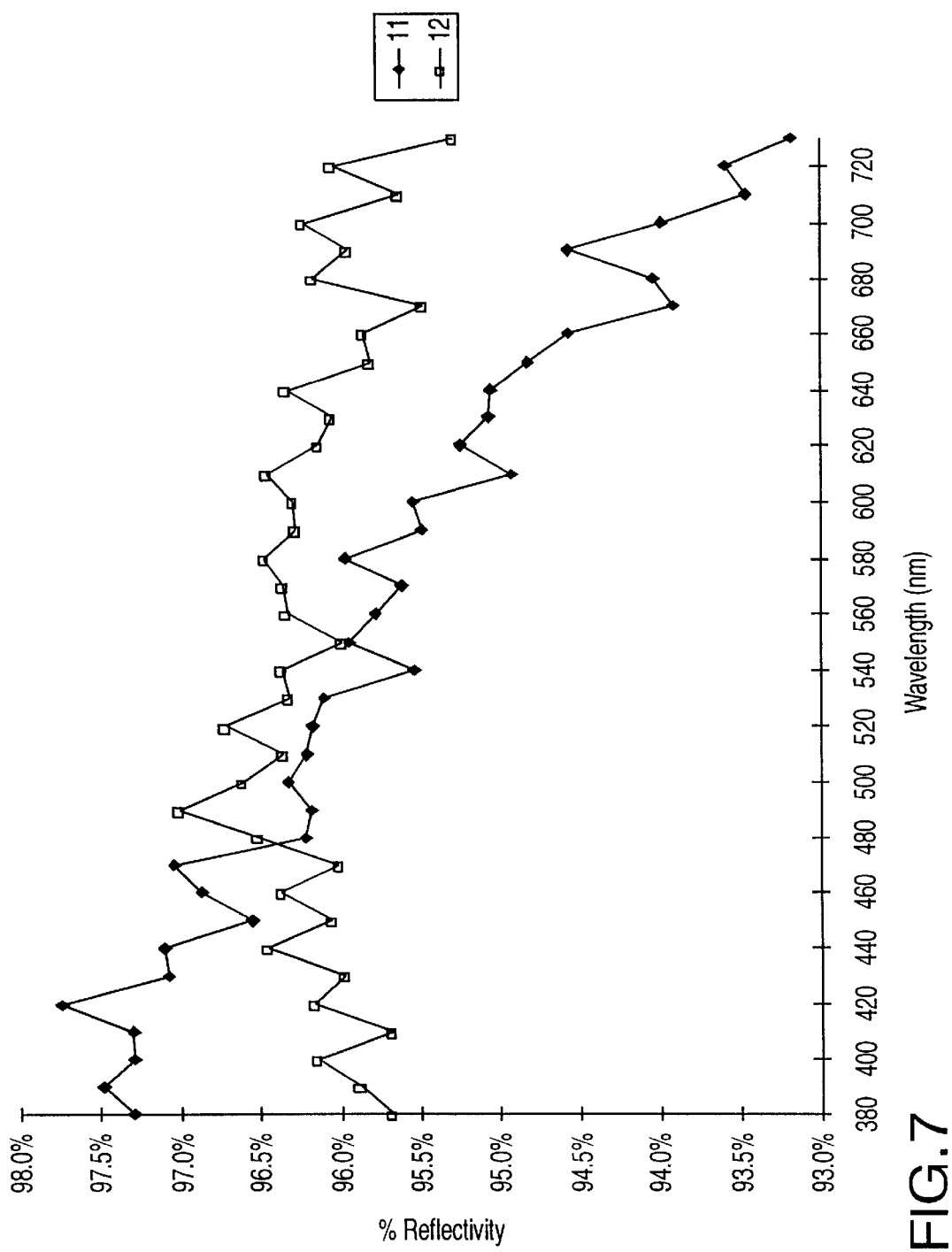
FIG. 7 is a graph illustrating the reflectance of diffuse reflectors made with another polymer that uses various methods for creating air voids.

Examples 11 and 12 were tested for their reflectance spectra. The results are shown in FIG. 7. Although the film with the higher polymer to diluent ratio had better reflectance at lower wavelengths, the thicker sheet of Example 12 had better reflectance overall.

Example 13

Figure 8:
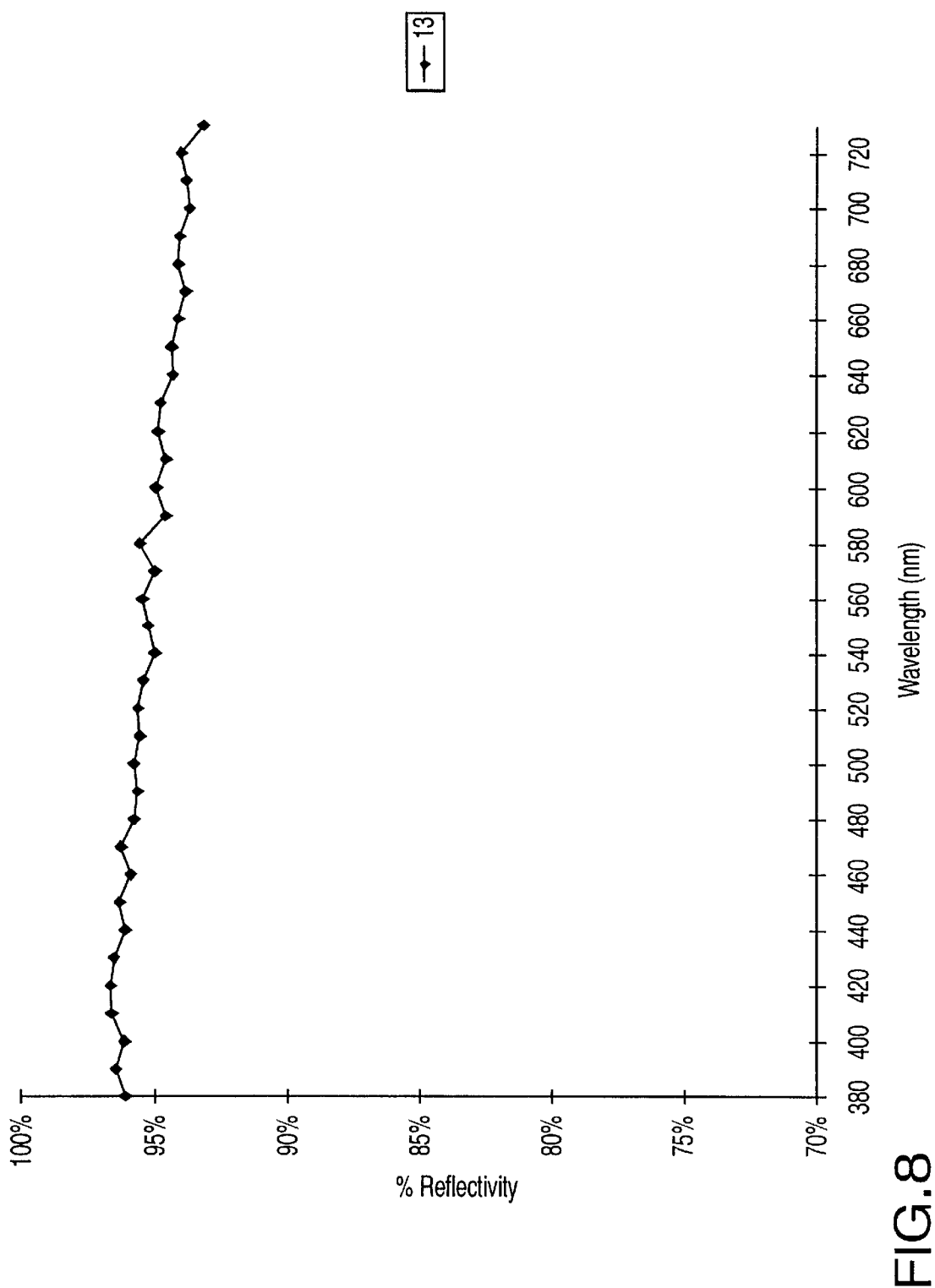
FIG. 8 is a graph depicting the diffuse reflectance of a film made from a liquid-liquid TIPS process.

Example 13 was a microporous film with a thickness of about 180 μm (7 mils) and available as a 0.2 μm polypropylene high flow filter from Poretics Corp., Livermore Calif. Example 13 was tested for its reflectance, and its appearance by Scanning Electron Micrograph (SEM) was that of a sheet made by a liquid-liquid TIPS process. The spectra results are shown in FIG. 8.

Example 14 and Comparative Example 5

The advantage of using a diffuse reflector of the invention in a LCD-containing device was demonstrated.

Example 14, a sheet of Example 1 was used as a backlight reflector in an LCD device that was assembled according to the schematic drawing of FIG. 9A. The fluorescent light source 4 was a 20 mm long, 3 mm diameter fluorescent bulb available from Harison Electric Company coupled to a clear plastic light guide 6 lined with a specular reflector (available as SILVERLUX™ SS-95P from 3M) and powered with an inverter and a 12 volt DC power supply. The diffuser 8 was a roughened polycarbonate sheet available from Tsujimoto Electric Co., Tokyo, Japan. The brightness enhancing film 10 was made of two pieces of Brightness Enhancement Film II 90/50 from 3M that were oriented at 90 degrees to each other. The reflective polarizer film 11 was Dual Brightness Enhancement Film also available from 3M. The LCD 13 was a 235 mm by 178 mm panel available as model LQ12S02 from Sharp Corporation, Tenri, Nara, 632, Japan. The diffuse reflector 17 was a porous polymeric TIPS sheet of Example 1 that was placed directly below light guide 6. In Example 14A, the sheet was used with its glossy side facing the light source and in Example 14B, its matte side faced the light.

The LCD device of Comparative Example 5 was made in a manner similar to Example 14 except the diffuse reflector 17 was a sheet of the material of Comparative Example 1.

Examples 14A and 14B and Comparative Example 5 were tested with an EZ Contrast conoscopic measuring device from ELDIM in Caen, France to determine the differences in luminance output from each example. The EZ Contrast camera and the computer interface were turned on and the camera was allowed to stabilize to −11° C. Each example was placed before the camera with the LCD panel facing the camera and an image was acquired for each sample using the computer interface. A horizontal scan was viewed and converted to an x-y plot of luminance output in candela/m$^2$ vs. viewing angle in degrees off orthogonal (from −60 to +60 degrees).

The luminance output increased by 17% on-axis (i.e., 0 degrees or orthogonal to the plane of LCD 13) for Example 14A and by 13% on-axis for Example 14B compared to Comparative Example 5.

Example 15 and Comparative Example 6

The advantage of using a diffuse reflector of the invention in a sign cabinet was demonstrated.

In Example 15, eight tape tabs were placed randomly on the face of a sign made from a sign substrate (available as PANAFLEX™ series 645 from 3M) with a light transmission of 28% as measured with a Macbeth densitometer, a width of 72 cm (31 in) and a height of 102 cm (40 in). The sign was illuminated with a sign cabinet available as SIGN-COMP™ from SignComp, Comstock Park, Mich., having a depth of 23 cm (9 in). The cabinet was illuminated with two "U" shaped high output fluorescent bulbs. The back interior, the top and right side of the cabinet interior were painted with a gloss white paint by the manufacturer. The left side and bottom of the interior were made of mill finished aluminum. Porous polymeric TIPS sheet of Example 1 was placed over the back only (A), the back, bottom and right (B) and all five sides (C) of the cabinet interior.

The lamps were turned on and allowed to stabilize for a period of one hour prior to measuring luminance. Luminance of the sign face was measured above each of the tape tabs with a Minolta luminance meter (model number LS-110 with a ⅓ degree spot) mounted on a tripod and the values were averaged for each condition.

In Comparative Example 6, luminance values were determined as in Example 15, except no film of Example 1 was placed over any side of the box.

Luminescence values are reported in Table 1.

TABLE 1

| Example | Reflectance Candela/m² | Increase over CE6 % |
|---------|------------------------|---------------------|
| 15A     | 826                    | 17                  |
| 15B     | 960                    | 36                  |
| 15C     | 1014                   | 43                  |
| CE6     | 706                    | —                   |

The invention increased the sign face brightness by 43%.

Examples 16–17 and Comparative Examples 7–8

The advantage of using a diffuse reflector of the invention in a light conduit was demonstrated.

In Example 16, two porous polymeric sheets as made in Example 1 were placed in a 25 cm (10 in) diameter light conduit having a construction similar to that shown in FIG. 11. One sheet was used as the extractor 46 and the other sheet was used as the back reflector 50.

In Example 17, a light conduit was made as in Example 16 except the back reflector 50 was made of a porous polymeric sheet of Example 3.

Comparative Example 7 was made similar to Example 16 except the back reflector 50 was a metal coated polymer film, SILVERLUX™ SS95P having a thickness of about 150 μm, and the extractor 46 was a white pigmented vinyl film, SCOTCHCAL™ series 7725-20 having a thickness of about 750 μm.

In Comparative Example 8, a light conduit was made as in Comparative Example 7 except the back reflector was made of TYVEK™ sheet.

Figure 12:
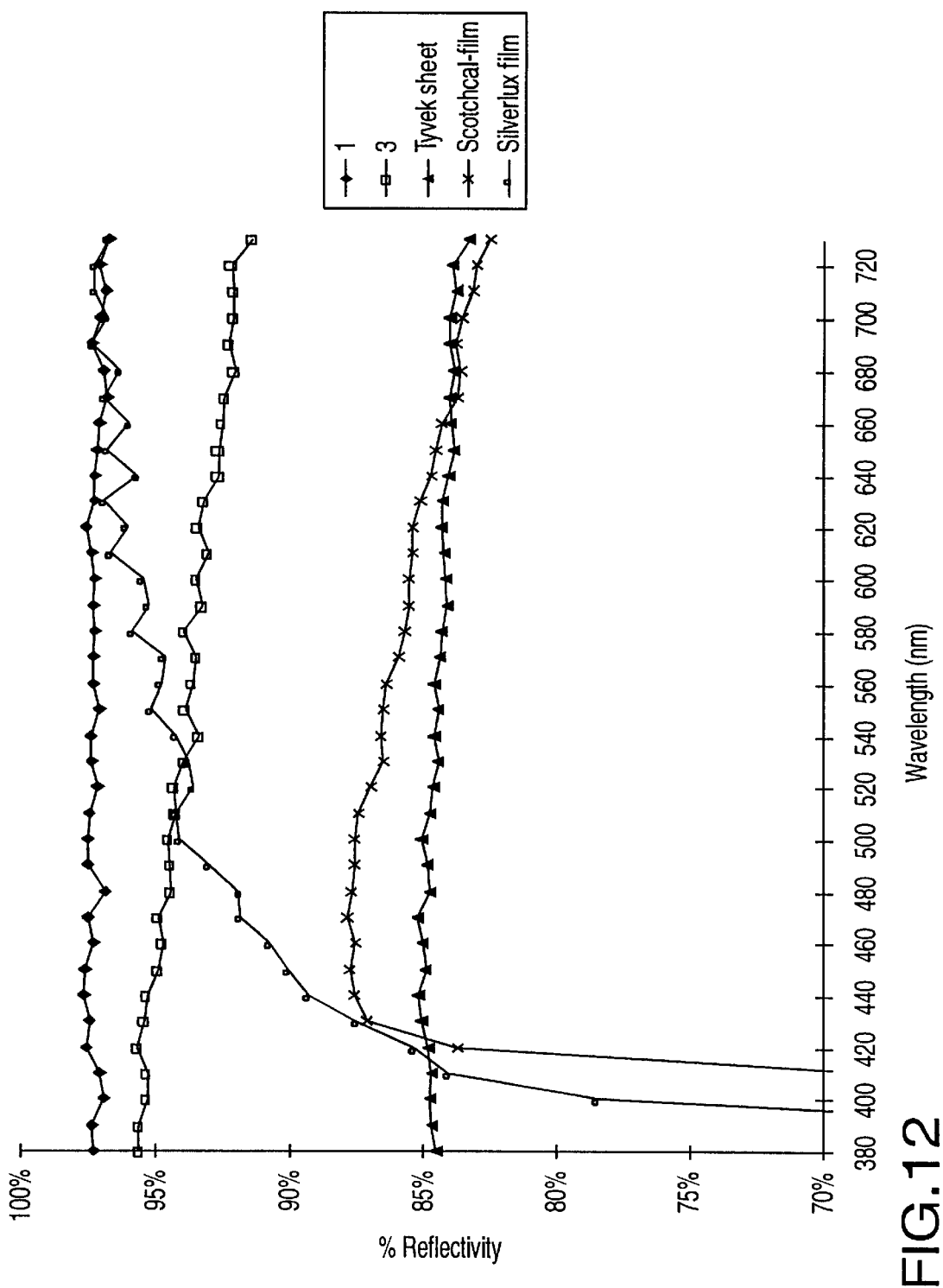
FIG. 12 is a graph illustrating the reflectance of various back reflectors and extractors useful in the construction of light conduits.

The diffuse reflective sheets were tested for their reflectance spectra using Method 1 and the results are shown in FIG. 12.

The extractor (TIPS sheet of Example 1) used in the examples had a diffuse reflectance over a broad range of visible light of about 97 percent. In contrast, the extractor used in Comparative Example 7 (SCOTCHCAL™ 7725-20) had a diffuse reflectance that was not linear over the range of visible light but showed greater absorption between 380 and 420 nm.

Using the Example 1 film as a back reflector film in Example 16 was preferred over the metallized film, SILVERLUX™, for two reasons. First, the film of Example 1 was more reflective than the metallized film. Secondly, the reflectance of the film of Example 1 was predominantly diffuse while that of the metallized film is predominantly specular. Some light may pass through the microprismatic wall 44 of conduit 39 due to imperfections in the prismatic film and exit the conduit at shallow angles to the conduit. With specular reflective metallized film as the back reflector 50, these stray light rays may be redirected back toward the tiny prisms at a shallow angle and reflected back to the metallized film. The light may be bounced back and forth until it is attenuated by absorption. Use of diffuse reflectors can reduce this loss by scattering the such stray light, allowing most to pass back through the prismatic film.

Example 3 film as a back reflector in Example 17 was preferred over the translucent TYVEK™ sheet of Comparative Example 8. Example 3 had a uniform average reflectance about 94%, but the average reflectance of TYVEK™ was more varied due to its variation in thickness within a single sheet. FIG. 1 depicts the spectra for a region of TYVEK™ sheet (CE2) that approximated a thickness closer to 150 μm and FIG. 12 shows a plot for a region of the same film that approximated a thickness closer to 250 μm. The average reflectance for the same film varied from about 77% to about 85% depending on thickness. In addition, the film of Example 3 had a uniform appearance while the random fiber construction of TYVEK™ sheet was adversely noticeable in this application.

Figure 13:
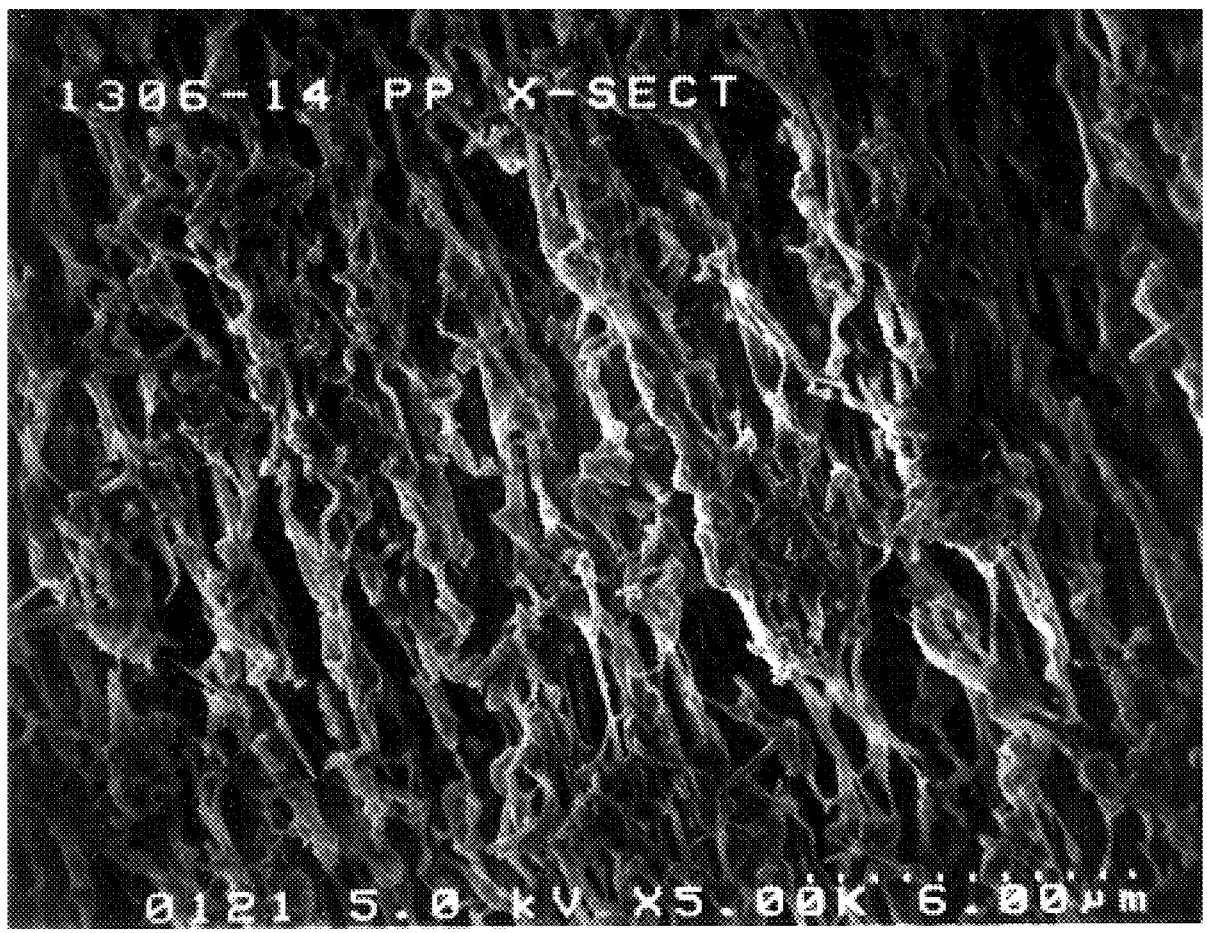
FIG. 13 is a scanning electron microscope (SEM) photomicrograph of the sheet of Example 1 at a magnification of 5,000×.

What is claimed is:

1. A diffuse reflective article comprising a diffuse reflective material attached to a structure capable of holding a diffuse reflective sheet material in place for use as a reflector wherein said diffuse reflective material is made of a porous polymeric sheet characterized by a microstructure comprising a network of polymer domains and fibrils interconnecting the domains, in which network the number of fibrils is not predominant over the number of polymer domains, as shown in FIG. 13.

2. A diffuse reflective article comprising a diffuse reflective material attached to a structure capable of holding a diffuse reflective sheet material in place for use as a reflector wherein said diffuse reflective material is made of a porous polyolefin sheet comprising a network of polymer domains and fibrils interconnecting the domains.

3. A diffuse reflective article comprising a diffuse reflective material attached to a structure capable of holding a diffuse reflective sheet material in place for use as a reflector wherein said diffuse reflective material is made of a porous polymeric sheet comprising a network of polymeric material having voids therein which material comprises:

(a) a polymer component, and (b) a diluent component, said diluent component being miscible with the polymer component at a temperature above the melting point of the polymer component or a liquid-liquid phase separation temperature of a total solution of polymer and diluent.

4. The diffuse reflective article of claim 3 wherein the porous polymeric sheet has a reflectivity greater than 92% at a wavelength of 550 nm according to ASTME 1164-94.

5. The article of claim 3, wherein the polymeric material comprises:

(a) at least 20 parts by weight of the polymer component; and (b) less than about 80 parts by weight of the diluent component.

6. The article of claim 3, wherein the polymer component is substantially non-absorbing to light at a wavelength between 380 and 730 nanometers.

7. The article of claim 3, wherein the polymer component is selected from the group consisting of polypropylene and polyethylene.

8. The article of claim 3, wherein the diluent component is substantially non-absorbing to light at a wavelength between 380 and 730 nanometers.

9. The article of claim 3, wherein the diluent component is mineral oil.

10. The article of claim 3, further comprising a specular reflective layer in combination with the porous polymeric layer.

11. The article of claim 3, wherein the structure is an optical cavity with the diffuse reflective material lining a portion of the cavity facing a light source.

12. The article of claim 11, wherein the optical cavity is in combination with a partially transparent image in which said image is a liquid crystal display.

13. The article of claim 12 further comprising a brightness enhancing film.

14. The article of claim 12, further comprising a reflective polarizer film.

15. A sign cabinet comprising walls and a light source, wherein at least one of the walls is lined with a diffuse reflective material made of a porous polymeric sheet comprising a network of polymeric material having voids therein which material comprises:

(a) a polymer component, and (b) a diluent component, said diluent component being miscible with the polymer component at a temperature above the melting point of the polymer component or a liquid-liquid phase separation temperature of a solution of polymer and diluent.

16. A light conduit comprising an optical lighting film, at least one of a back reflector and an extractor, which is a strip of material placed against the interior side of the optical lighting film of the light conduit to cause light to exit the conduit, wherein the back reflect or, the extractor or both comprise a diffuse reflective material made of a porous polymeric sheet comprising a network of polymeric material having voids therein which material comprises:

(a) a polymer component, and (b) a diluent component, said diluent component being miscible with the polymer component at a temperature above the melting point of the polymer component or a liquid-liquid phase separation temperature of a solution of polymer and diluent.

17. A method of improving diffuse reflectivity of light comprising using a diffuse reflective material to cause light energy to reflect off of it, wherein the material comprises a porous polymeric sheet comprising a network of polymeric material having voids therein which material comprises:

(a) a polymer component, and (b) a diluent component, said diluent component being miscible with the polymer component at a temperature above the melting point of the polymer component or a liquid-liquid phase separation temperature of a total solution of polymer and diluent.

18. The method of claim 17, wherein the polymer component is selected from the group consisting of polypropylene and polyethylene.

19. The method of claim 17, wherein the diluent component is mineral oil.

* * * * *

UNITED STATES PATENT AND TRADEMARK OFFICE
CERTIFICATE OF CORRECTION

PATENT NO.: 5,976,686
DATED: November 2, 1999
INVENTOR(S): Scott R. Kaytor, David R. Gagnon, Kenneth A. Epstein, Clinton P. Waller, Jr., William A. Hibbard, John C. Harvey, Stephen J. Pojar and Neal T. Strand It is certified that error appears in the above-identified patent and that said Letters Patent is hereby corrected as shown below:

On the title page:
[75] Inventors: "London" should read --London Ontario--.

Column 5, line 37, "nixes" should read --mixes--.

Column 13, line 9, "0,500" should read --0, 500--.

Column 14, line 1, "Example" should read --In Example--.

Column 17, line 16, "reflect or" should read --reflector--.

Signed and Sealed this

Twenty-second Day of May, 2001

Attest:

NICHOLAS P. GODICI

Attesting Officer

Acting Director of the United States Patent and Trademark Office